(12) United States Patent
Pajona

(10) Patent No.: US 11,595,096 B2
(45) Date of Patent: *Feb. 28, 2023

(54) BEAM FORMING AND BEAM STEERING USING ANTENNA ARRAYS

(71) Applicant: AVX Antenna, Inc., San Diego, CA (US)

(72) Inventor: Olivier Pajona, Antibes (FR)

(73) Assignee: KYOCERA AVX COMPONENTS (SAN DIEGO), INC., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/571,929

(22) Filed: Jan. 10, 2022

(65) Prior Publication Data
US 2022/0140875 A1 May 5, 2022

Related U.S. Application Data (63) Continuation of application No. 16/910,521, filed on Jun. 24, 2020, now Pat. No. 11,223,404.

(Continued)

(51) Int. Cl.
*H04B 7/06* (2006.01)
*H04B 7/0413* (2017.01)
*H04W 84/04* (2009.01)

(52) U.S. Cl.
CPC ......... *H04B 7/0617* (2013.01); *H04B 7/0413* (2013.01); *H04W 84/042* (2013.01)

(58) Field of Classification Search
CPC .. H04B 7/0469; H04B 7/0617; H04B 7/0695; H04B 7/0408; H04B 7/0691;
(Continued)

(56) References Cited

U.S. PATENT DOCUMENTS 6,184,828 B1 * 2/2001 Shoki ................. H01Q 3/26
342/372
6,307,507 B1 * 10/2001 Gross ................. H01Q 1/288
342/372

(Continued)

FOREIGN PATENT DOCUMENTS

JP 2018-136219 8/2018

OTHER PUBLICATIONS

International Search Report and Written Opinion for Application No. PCT/US2020/039266, dated Sep. 29, 2020, 12 pages.

(Continued)

*Primary Examiner* — Khanh C Tran
(74) *Attorney, Agent, or Firm* — Dority & Manning, P.A (57) ABSTRACT

Antenna systems are provided. In one example, an antenna system includes a first antenna array having a plurality of first antenna elements. The first antenna elements are operable to communicate one or more signals via a communication protocol tin a multiple input multiple output (MIMO) mode. The antenna system includes a second antenna array having a plurality of second antenna elements. The antenna system includes a control circuit configured to control operation of one or more of the second antenna elements of the second antenna array in a first mode or a second mode. In the first mode, one or more of the second antenna elements are configured to provide a secondary function to support communication of the first antenna elements via the communication protocol. In a second mode. One or more of the second antenna elements are configured to support beam forming or beam steering of the first antenna elements.

18 Claims, 5 Drawing Sheets

Related U.S. Application Data (60) Provisional application No. 62/865,450, filed on Jun. 24, 2019.

(58) Field of Classification Search
CPC .... H04B 7/0825; H04B 7/0874; H04B 7/088; H04B 7/10; H04B 7/15585; H04B 7/0413; H04B 7/0689; H04W 16/28
See application file for complete search history.

(56) References Cited

U.S. PATENT DOCUMENTS

| | | | |
|---|---|---|---|
| 6,765,536 B2 | 7/2004 | Phillips et al. | |
| 6,987,493 B2 | 1/2006 | Chen | |
| 7,068,234 B2 | 6/2006 | Sievenpiper | |
| 7,215,289 B2 | 5/2007 | Harano | |
| 7,830,320 B2 | 11/2010 | Shamblin | |
| 7,911,402 B2 | 3/2011 | Rowson et al. | |
| 8,362,962 B2 | 1/2013 | Rowson et al. | |
| 8,446,318 B2 | 5/2013 | Ali et al. | |
| 8,462,063 B2 | 6/2013 | Gummalla et al. | |
| 8,648,755 B2 | 2/2014 | Rowson et al. | |
| 8,717,241 B2 | 5/2014 | Shamblin et al. | |
| 9,065,496 B2 | 6/2015 | Rowson et al. | |
| 9,231,669 B2 | 1/2016 | Desclos et al. | |
| 9,240,634 B2 | 1/2016 | Rowson et al. | |
| 9,287,841 B2 | 3/2016 | Chiang et al. | |
| 9,425,497 B2 | 8/2016 | Pajona et al. | |
| 9,439,151 B2 | 9/2016 | Zhu et al. | |
| 9,479,242 B2 | 10/2016 | Desclos et al. | |
| 9,590,703 B2 | 3/2017 | Desclos et al. | |
| 9,755,305 B2 | 9/2017 | Desclos et al. | |
| 9,755,580 B2 | 9/2017 | Desclos et al. | |
| 10,938,360 B1 | 3/2021 | Wang et al. | |
| 2008/0273579 A1* | 11/2008 | Rofougaran | H01Q 21/062 375/E7.002 |
| 2011/0150050 A1 | 6/2011 | Trigui et al. | |
| 2011/0223925 A1 | 9/2011 | Gale et al. | |
| 2013/0162476 A1 | 6/2013 | Thomas et al. | |
| 2014/0334564 A1 | 11/2014 | Singh et al. | |
| 2015/0036656 A1 | 2/2015 | McCarthy et al. | |
| 2015/0036726 A1 | 2/2015 | Pajona et al. | |
| 2016/0322702 A1 | 11/2016 | Sayama et al. | |
| 2016/0365900 A1 | 12/2016 | Kim et al. | |
| 2016/0373181 A1 | 12/2016 | Black et al. | |
| 2018/0352446 A1 | 12/2018 | Tsutsui | |
| 2019/0089419 A1 | 3/2019 | Kim et al. | |
| 2020/0036824 A1 | 1/2020 | Lee et al. | |
| 2020/0083948 A1* | 3/2020 | Lim | H01Q 1/243 |
| 2020/0227824 A1* | 7/2020 | Abdalla | H01Q 3/267 |
| 2020/0367083 A1 | 11/2020 | Hao et al. | |

OTHER PUBLICATIONS

Supplementary European Search Report for Application No. EP 20830643, dated Sep. 29, 2022, 12 pages.

* cited by examiner

BEAM FORMING AND BEAM STEERING USING ANTENNA ARRAYS

PRIORITY CLAIM

The present application claims the benefit of priority to U.S. patent application Ser. No. 16/910,521, titled "Beam Forming and Beam Steering Using Antenna Arrays," having a filing date of Jun. 24, 2020, which is based on and claims priority to U.S. Provisional Application Ser. No. 62/865,450, titled "Beam Forming and Beam Steering Using Antenna Arrays," filed on Jun. 24, 2019, which is incorporated herein by reference.

FIELD

The present disclosure relates generally to antenna systems for wireless communication systems, such as antenna system for use in 5G cellular communication systems.

BACKGROUND

Electronic devices such as laptops, tablets, smartphones, IoT (Internet of Things) devices, etc. can be operable to communicate over cellular networks. Cellular networks operating at 4G are in abundant use and have recently evolved to provide moderate to high data-rate transmissions along with voice communications in a stable and reliable network over large regions. Communication systems are transitioning to 5G protocol and networks. 5G networks can provide substantially higher data-rates and lower latency, and can be applicable for voice, data, and IoT applications.

SUMMARY

Aspects and advantages of embodiments of the present disclosure will be set forth in part in the following description, or may be learned from the description, or may be learned through practice of the embodiments.

One example aspect of the present disclosure is directed to an antenna system. The antenna system includes a first antenna array having a plurality of first antenna elements. The first antenna elements are operable to communicate one or more signals via a communication protocol tin a multiple input multiple output (MIMO) mode. The antenna system includes a second antenna array having a plurality of second antenna elements. The antenna system includes a control circuit configured to control operation of one or more of the second antenna elements of the second antenna array in a first mode or a second mode. In the first mode, one or more of the second antenna elements are configured to provide a secondary function to support communication of the first antenna elements via the communication protocol. In a second mode. One or more of the second antenna elements are configured to support beam forming or beam steering of the first antenna elements.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to systems and methods for beam forming and/or beam steering using an antenna array(s) in communication systems, such as 5G communication systems. For instance, an antenna system for a device can include a plurality of different antenna arrays. Each antenna array can have a plurality of different antenna elements. The antenna elements can be shared between arrays to either provide a secondary function (e.g., multiple input multiple output (MIMO), diversity), to support main communication via a communication protocol (e.g., 5G communication protocol), or to support beam forming and/or beam steering.

5G communication protocols can be implemented, for instance, using antenna arrays that are configured for MIMO communication and/or communication at higher frequency bands (e.g., a frequency band in the range of about 24 GHz to about 86 GHz). Each of these antenna arrays can include a plurality of antenna elements. The antenna elements can be individually and/or collectively controlled to communicate signals (e.g., RF signals) in a MIMO mode (e.g., a 4×4 MIMO mode). This can provide for higher data-rates and lower latency in wireless communications.

An electronic device (e.g., a mobile device, IoT device, or other electronic device) can include a plurality of different antenna arrays (e.g., two antenna arrays, three antenna arrays, four antenna arrays). One of the antenna arrays (e.g., a main antenna array) can be used for main communications via a communication protocol (e.g., a cellular communication protocol such as 3G, 4G (LTE), 5G protocol). One or more different antenna arrays can be used to provide a secondary function to support communication of the main antenna array. For instance, the antenna array can be used to further enhance MIMO and/or diversity operation of the main antenna array.

According to example aspects of the present disclosure, selected antenna elements from the plurality of different antenna arrays can be used to support "beam forming" or "beam steering" of the main antenna array. Beam forming refers to the combination of different antenna beams to increase the signal strength in a particular direction (e.g., the direction of a base station) to enhance communication links. "Beam steering" refers to dynamically steering an antenna beam such that the direction of high gain of the antenna beam is pointed in a particular direction (e.g., the direction of a base station).

For example, one or more antenna elements of the main antenna array can be switched from being used to support MIMO and/or diversity to being used for beam steering or beam forming. In addition, and/or in the alternative, one or more additional antenna elements from different antenna arrays can be switched from being used to support MIMO and/or diversity to being used for beam steering or beam forming. In this way, aspects of the present disclosure can have a technical effect of allowing different antenna elements among different antenna arrays to be shared for supporting MIMO/diversity and/or for beam steering or beam forming to enhance the usage of available resources within the antenna arrays and to enhance radio performance.

As used herein, a "mobile device" is an electronic device capable of communicating wirelessly and capable of being carried by hand of a user while in normal operation. Example mobile devices include smartphones, tablets, laptops, wearable devices, personal digital assistants, and portable digital music players. As used herein, the use of the term "about" in conjunction with a numerical value refers to within 10% of the stated numerical value.

Figure 1:
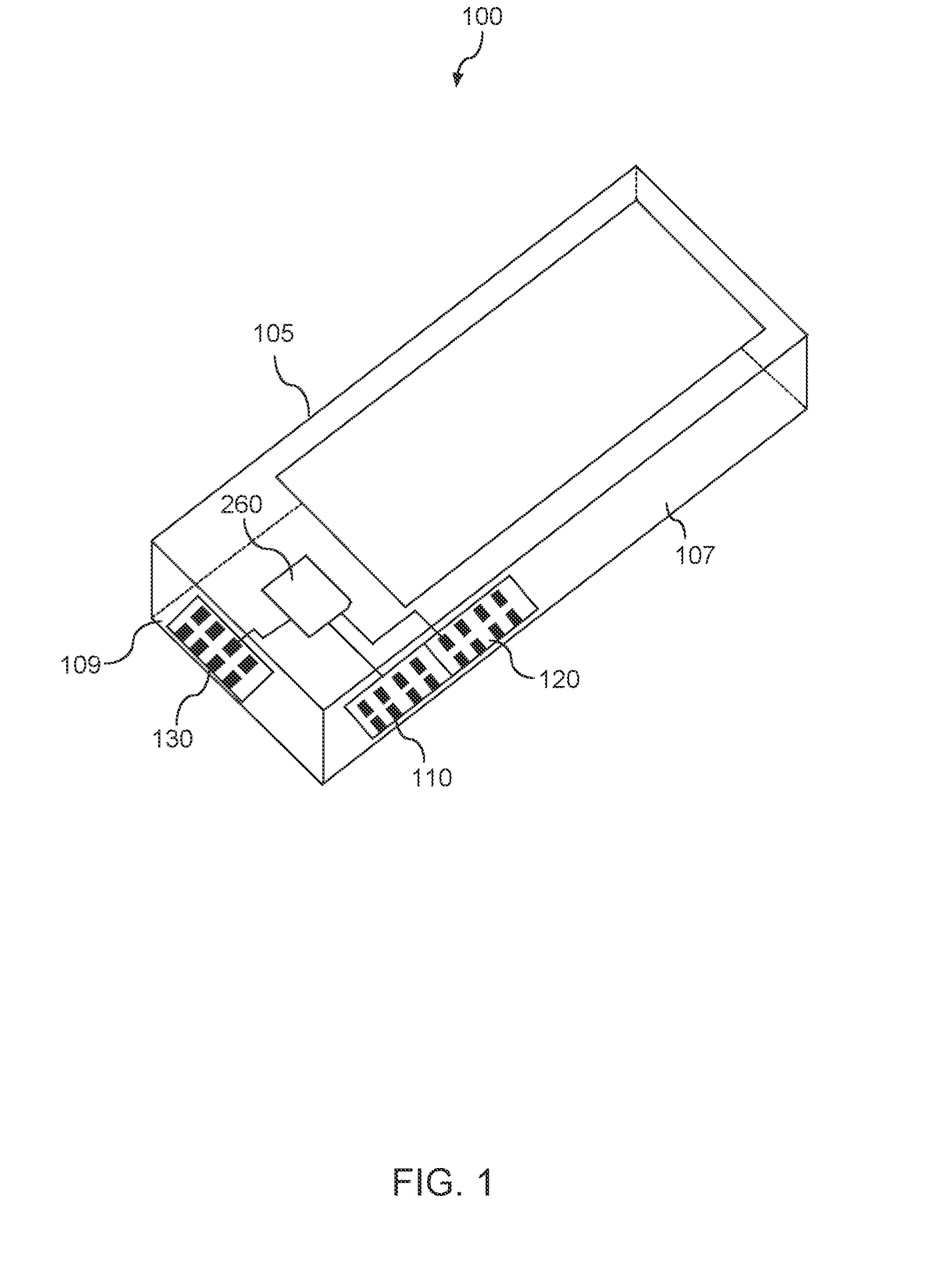
FIG. 1 depicts a mobile device having an antenna system according to example embodiments of the present disclosure.

FIG. 1 depicts an example mobile device 100 supporting cellular communication and having beam steering or beam forming capabilities according to example embodiments of the present disclosure. As shown, the mobile device includes a housing 104. The housing 104 can include a plurality of different surfaces (e.g., edge surfaces). For instance, the housing 104 has a first surface 107 and a second surface 109 and other surfaces (not designated). The mobile device 100 can include interface elements (e.g., touch screen, touch pad, key board, camera, microphone) to allow a user to interact with the mobile device 100.

The housing 104 accommodates three antenna arrays: a first antenna array 110, a second antenna array 120, and a third antenna array 130. Three antenna arrays are illustrated for purposes of illustration and discussion. Those of ordinary skill in the art, using the disclosures provided herein, will understand that more or fewer antenna arrays can be used without deviating from the scope of the present disclosure.

Each of the first antenna array 110, second antenna array 120, and third antenna array 130 can include a plurality of antenna elements. Each antenna element can be configured to communicate one or more signals via a cellular communication protocol, such as a 5G communication protocol. Each antenna element can be configured to communicate one or more signals in a frequency band in the range of about 24 GHz to about 86 GHz. In some embodiments, each antenna array can include a plurality of antenna elements (e.g., radiating elements) disposed on a substrate (e.g., a circuit board).

The first antenna array 110 and the second antenna array 120 are illustrated as being proximate to the same surface of the mobile device 100, namely surface 107. The third antenna array 130 is illustrated as being on a different surface (e.g., surface 109) relative to the first antenna array 110 and the second antenna array 120. In this way, the antenna array can be located proximate the same surface or located proximate different surfaces of the mobile device 100.

Figure 2:
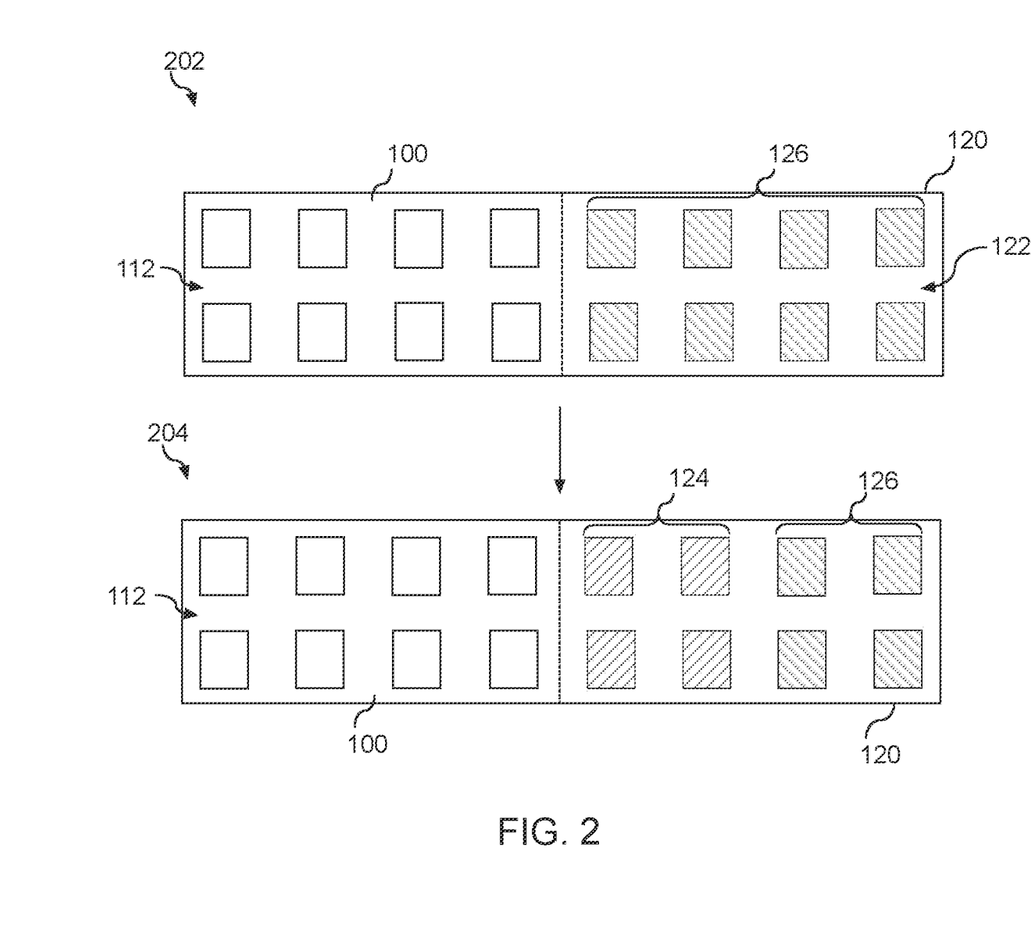
FIG. 2 depicts configuration of antenna array(s) in an antenna system according to example embodiments of the present disclosure.

FIG. 2 depicts example configuration of the first antenna array 110 and second antenna array 120 according to example embodiments of the present disclosure. More particularly, in configuration 202, a plurality of first antenna element 112 are configured to support main communication via a communication protocol (e.g., a 5G communication protocol). The plurality of first antenna elements 112 can be communicate via a communication protocol in a MIMO mode. For instance, the plurality of first antenna elements 112 can be configured for operation in a 4×4 MIMO mode.

In configuration 202, a plurality of second antenna elements 122 associated with a second antenna array 120 are configured to provide a secondary function to support main communication of the first antenna elements 112 in the first antenna array 110. For instance, the plurality of second antenna elements 122 of the second antenna array 120 can provide additional MIMO capability and/or diversity for the first antenna elements 112 in the first antenna array 110.

In configuration 202, a first subset 126 of the second antenna elements 122 are configured to provide the secondary function to support the first antenna elements 112 of the first antenna array 110. The first subset 126 includes all of the second antenna elements 122 in the second antenna array 120. A second subset (no antenna elements) of the second antenna array 120 are configured to support beam steering or beam forming of the first antenna elements 112 of the first antenna array 110.

According to example aspects of the present disclosure, a control circuit can adjust the configuration of the first antenna array 110 and the second antenna array 120 from configuration 202 to configuration 204. In configuration 204, a subset 124 of the second antenna elements 122 have been configured to support beam steering or beam forming of the first antenna elements 112 of the first antenna array 110. Subset 126 of second antenna elements 122 remain configured to support the secondary function (e.g., MIMO, diversity) of the first antenna elements 112 of the first antenna array 110.

The example of FIG. 2 discusses the configuration of antenna elements across two antenna arrays for purposes of illustration and discussion. Those of ordinary skill in the art, using the disclosures provided herein, will understand that the antennal elements can be associated with a single antenna array or more than two antenna arrays without deviating from the scope of the present disclosure. For example, the antenna elements 112 and 122 can be all part of a single antenna array without deviating from the scope of the present disclosure. As another example, antenna elements across first antenna array 110, second antenna array 120, and third antenna array 130 can be used without deviating from the scope of the present disclosure In some embodiments, the mechanism for configuring antenna elements for beam forming or beam steering in this example can be implemented, for instance, by introducing phase shifts in signals communicated to the antenna elements. In some implementations, the phase shifts can be implemented using delay lines that introduce a time delay in signals communicated using the delay line. In some embodiments, the phase shifts can be implemented using a phase shifter.

Figure 3A:
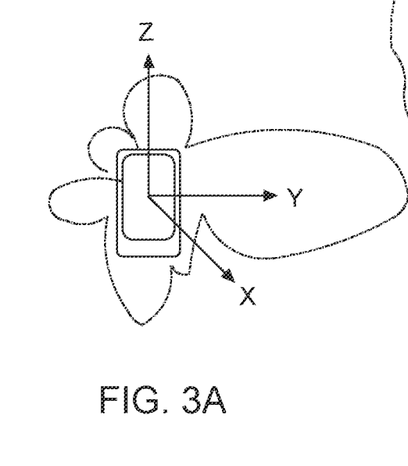
FIGS. 3A, 3B and 3C depicts an example beam forming or beam steering according to example embodiments of the present disclosure.
Figure 3B:
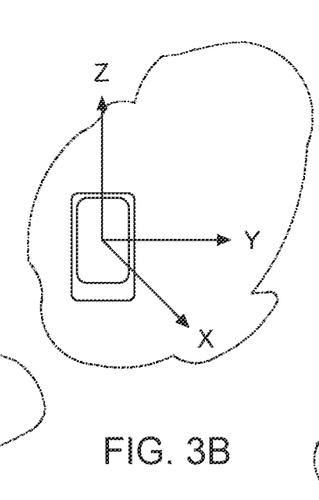
Figure 3C:
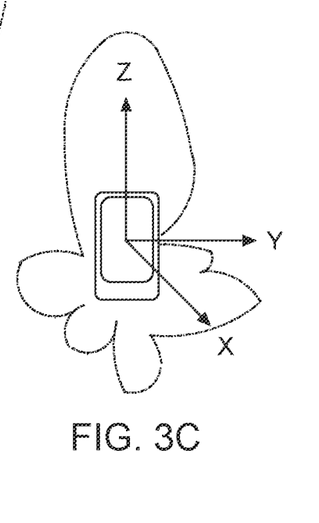

FIGS. 3A-3C illustrate examples of three different radiation patterns corresponding to three different phase shifts implemented among antenna elements. In this example, the mobile device is configured to include a first antenna array or one or more first antenna elements of a first antenna array that generates a first radiation pattern having the highest gain in the Y direction, and a second antenna array or one or more second antenna elements of a second antenna array that generates a second radiation pattern having the highest gain in the Z direction. FIG. 3A illustrates a first mode in which the time delay, or the phase shift, is set so that the contribution from the second radiation pattern is almost negligible, resulting in a combined radiation pattern having the highest gain in the Y direction. FIG. 3B illustrates a second mode in which the time delay, or the phase shift, is set so that the first and second radiation patterns coexist in phase, resulting in a combined radiation pattern having the highest gain in the Y+Z direction. FIG. 3C illustrates a third mode in which the time delay, or the phase shift, is set so that the contribution from the first radiation pattern is almost negligible, resulting in a combined radiation pattern having the highest gain in the Z direction.

Figure 4:
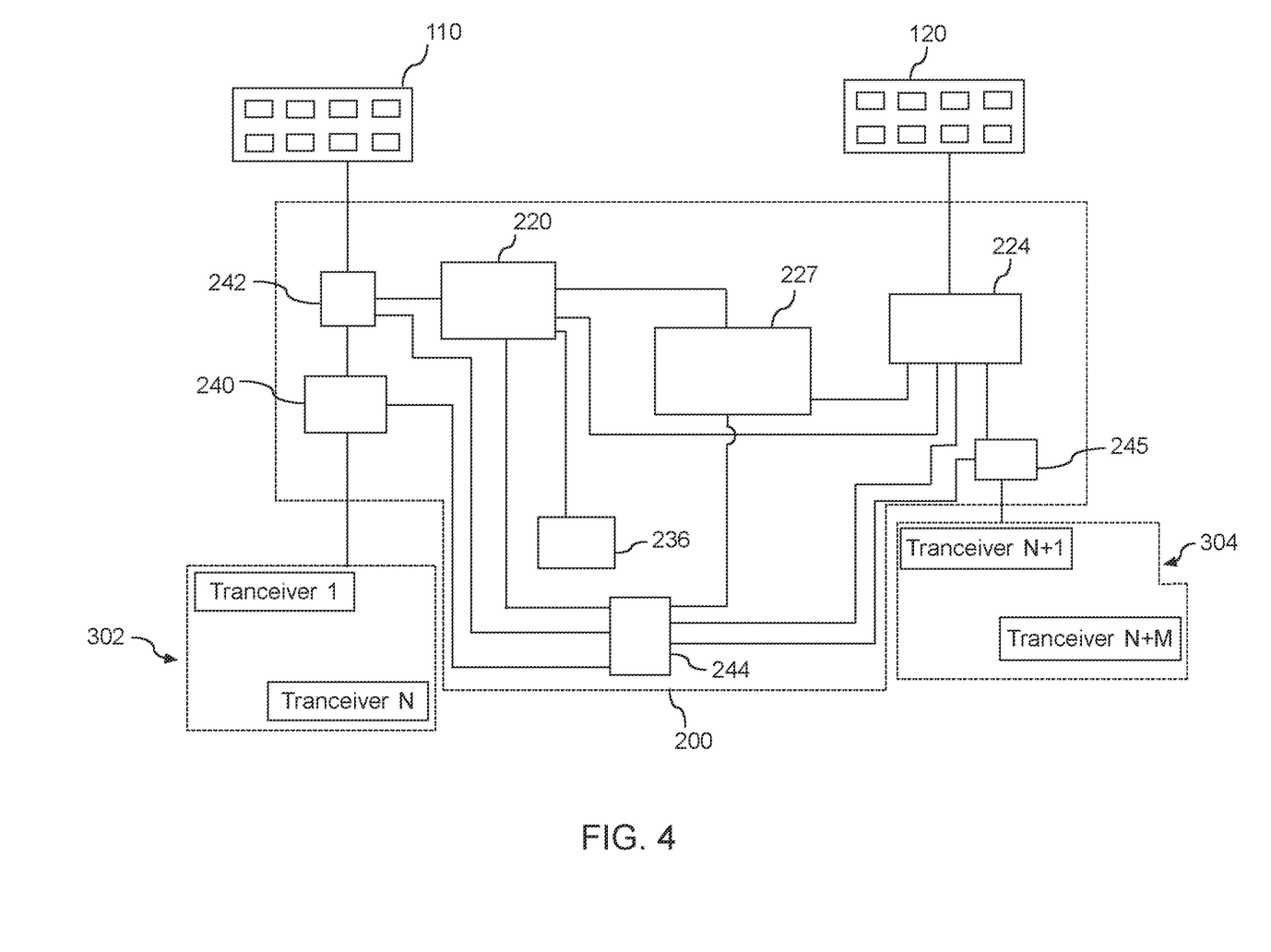
FIG. 4 depicts an example control circuit for configuring an antenna system according to example embodiments of the present disclosure.

FIG. 4 depicts a schematic of an example control circuit 200 configured to configure antenna arrays according to example embodiments of the present disclosure. This example illustrates a case in which a first through $N^{th}$ protocols, including a 5G communication protocol are supporting with a first antenna 110 having a plurality of antenna elements. The first antenna array 110 can be similar to the first antenna array 110 illustrated in FIGS. 1 and 2. A second antenna array 120 having a plurality of antenna elements can be used to support communications of the first antenna array 110 by either being configured for a secondary function (e.g., MIMO, diversity) or being configured for beam steering or beam forming. The second antenna array 120 can be similar to the second antenna arrays 120 illustrated in FIGS. 1 and 2.

Control circuit 200 is operable to configure antenna elements among the first antenna array 110 and the second antenna array 120 between supporting a secondary function and supporting beam forming or beam steering.

A first through $N^{th}$ transceivers 302 are associated with the first antenna array 110 for processing signals according to the first $N^{th}$ protocols, including a 5G communication protocol. Other protocols supported by the transceivers 302 can include a 2G protocol, 3G protocol, 4G (LTE) protocol, etc. An $(N+1)^{ro}$ through $(N+M)^{th}$ transceivers 304 are associated with the second antenna array 120 for performing the originally intended function in conjunction with one or more of the first—$N^{th}$ protocols, including a 5G communication protocol. Other protocols supported by the transceivers 304 can include a 2G protocol, 3G protocol, 4G (LTE) protocol, etc.

The control circuit 200 can include a first switching component 220 and a second switching component 224. The first switching component 220 and the second switching component 224 can be coupled to each other via a phase shifting component 227. The phase shifting component 227 can be configured to provide multiple phase shifts between signals communicated among antenna elements of the first array 110 and 120 to implement beam steering and/or beam forming functionality.

For instance, the phase shifting component 227 can include a plurality of transmission lines of differing electrical lengths that can serve as delay lines that can be selectively coupled to one or more antenna elements using the first switching component 220 and the second switching component 224. In addition and/or in the alternative, the phase shifting component 227 can include one or more phase shifters configured to implement phase shifts in signals communicated via the phase shifting component 227.

The first switching component 220 can include a plurality of first switches (e.g., transistors, or other switching devices) configured to selectively couple individual antenna elements of the first antenna array 110 to the phase shifting component 227. The second switching component 224 can include a plurality of second switches (e.g., transistors or other switching devices) configured to selectively couple individual antenna elements of the second antenna array 120 to the phase shifting component 227. The first switching component 224 can include a path to be open, grounded or shorted to a component or module in the system, as represented by block 236.

The control circuit 200 can include a module 240 configured to select one or more of the transceivers 302 to be coupled to individual antenna elements of the first antenna array 110 during a time period. The module 240 can be coupled to a power combiner/splitter 242 which can be configured to select between providing signals to the antenna array 110 and/or the first switching component 220. The control circuit 200 can include a module 245 configured to select one or more of the transceivers 304 to be coupled to individual antenna elements of the second antenna array 120 during a time period.

A controller 244 (e.g., a processor, microprocessor, etc. configured to execute computer readable instructions stored in one or more memory devices) can be coupled to various components of the control circuit 200, such as first switching component 220, second switching component 224, phase shifting component 227, module 240, module 245, and power combiner/splitter 242 to control the selection of paths/phase shifts.

The control circuit 200 can control the elements to communicate one or more signals via a communication protocol by controlling module 240 to couple a selected transceiver of the transceivers 302 to one or more antenna elements in the first antenna array 110. The communication protocol can be, for instance, a 5G communication protocol. One or more of the antenna elements in the first antenna array 110 can be configured to communicate signal via the communication protocol in a MIMO mode.

The control circuit 200 can configure one or more of the antenna elements in the second antenna array 120 to be in a first mode or in a second mode. In the first mode, one or more of the second antenna elements are configured to provide a secondary function (e.g., MIMO, diversity) to support communication of the first antenna elements via the communication protocol.

More particularly, when one or more antenna elements of the second antenna array 120 are used for MIMO or diversity, the controller 244 can control the second switching component 224 and the module 245 to selective couple one or more of the antenna elements of the second antenna array 120 to the appropriate transceiver of the transceivers 304. In addition, the controller 244 can control the first switching component 224 to selectively couple one or more of the antenna elements of the first antenna array 110 to block 236 (e.g., open, grounded, shorted, etc.). The controller 244 can also control components to otherwise decouple one or more antenna elements of the first antenna array 110 from one or more antenna elements of the second antenna array 120.

When in the second mode, the control circuit 200 can control one or more of the antenna elements of the second antenna array 120 and/or the first antenna array 110 to support beam forming or beam steering of the first antenna elements. For instance, the first switching component 220 and the second switching component 240 can be controlled by controller 244 to connect path(s) to the phase shifting component 227 so as to couple two or more antenna elements among the first antenna array 110 and/or the second antenna array 120. The phase shifting component 227 can be phase shifts between radiation patterns associated with the antenna elements for beam forming or beam steering.

Figure 5:
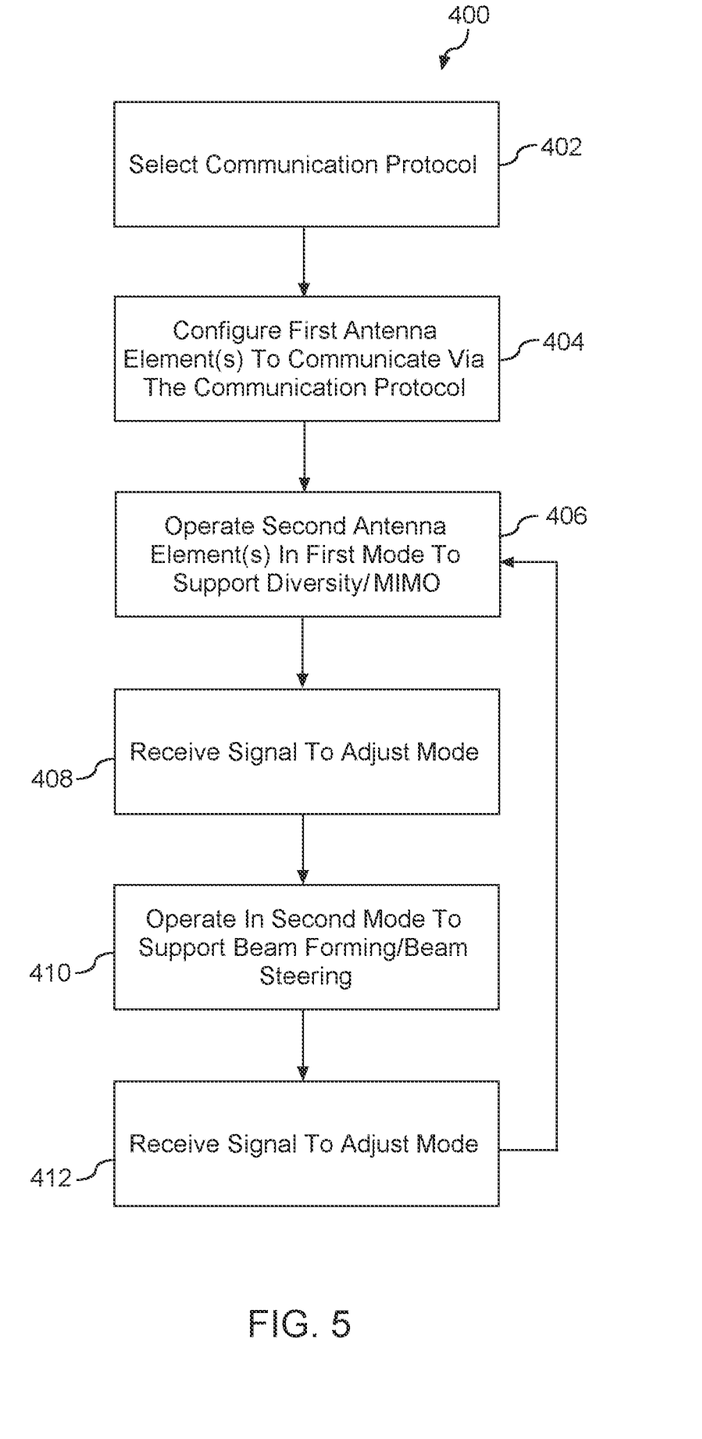
FIG. 5 depicts a flow diagram of an example method according to example embodiments of the present disclosure.

FIG. 5 depicts a flow diagram of an example method (400) according to example embodiments of the present disclosure. The method (400) can be implemented, for instance, using the antenna system(s) illustrated in FIGS. 1-4. FIG. 5 depicts steps performed in a particular order for purposes of illustration and discussion. Those of ordinary skill in the art, using the disclosures provided herein, will understand that various steps of any of the methods described herein can be adapted, omitted, rearranged, include steps not illustrated, performed simultaneously, and/or modified in various ways without deviating from the scope of the present disclosure.

At (402), the method can include selecting a communication protocol for communication with an antenna system. The communication protocol can be, for instance, a 5G communication protocol. The 5G communication protocol can require MIMO operation of antennas and/or communication in higher frequency bands, such as a frequency band in the range of about 24 GHz to about 86 GHz.

At (404), The method can include configuring first antenna elements to communication via the communication protocol. For instance, a plurality of antenna elements across one or more antenna arrays in a mobile device can be coupled to a transceiver to communicate signal via the 5G communication protocol, for instance, in a MIMO mode.

At (406), the method can include operating one or more second antenna element(s) to provide a secondary function to support communication of one or more signals by the first antenna elements via the communication protocol. The secondary function can include configuring the second antenna elements to support MIMO communication via the communication protocol. The secondary function can include operating the one or more second antenna elements to act as diversity antenna elements. The one or more second antenna elements can be part of the same antenna array as the first antenna elements and/or a different antenna array.

At (408), the method can include receiving a signal to adjust a mode of operation of the second antenna elements to support beam steering or beam forming. In some embodiments, the signal to adjust the mode of operation can be based on a channel quality indicator (CQI) associated with a communication link between the antenna system and a base station. For instance, the signal to adjust the mode of operation can be implemented to increase a CQI of a communication link. Example CQIs include one or more of include signal-to-noise ratio (SNR), signal to interference-plus-noise ratio (SINR), receive signal strength indicator (RSSI) bit error rate (BER) and other metrics, which are called channel quality indicators (CQI). Other triggers/signals can be used to adjust the mode of operation of the second antenna element(s), such as expiration of a time period, at regular intervals, when communicating with certain base stations, etc.

At (410), the method can include operating the one or more second antenna elements to support beam steering or beam forming as described in detail above. For instance, signals can be passed through a phase shifter module including one or more delay lines, phase shifters, etc. to implement beam steering and/or beam forming with the second antenna elements.

At (412), the method can include receiving a signal to adjust a mode of operation of the second antenna elements to support the secondary function. In some embodiments, the signal to adjust the mode of operation can be based on a CQI associated with a communication link between the antenna system and a base station. For instance, the signal to adjust the mode of operation can be implemented to increase a CQI of a communication link. Other triggers/signals can be used to adjust the mode of operation of the second antenna element(s), such as expiration of a time period, at regular intervals, when communicating with certain base stations, etc.

Upon receipt of the signal at (412), the method can return (406) and operate the one or more second antenna elements in a mode to provide a secondary function to support communication by the first antenna elements via the communication protocol. In this way, communication link quality can be enhanced through dynamic adjustment of second antenna elements between secondary function support (e.g., MIMO, diversity) and beam steering or beam forming support.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. An antenna system comprising:
   an antenna array having a plurality of first antenna elements and a plurality of second antenna elements, each of the first antenna elements operable to communicate one or more signals via a communication protocol in a multiple input multiple output mode; and
   a control circuit configured to control operation of one or more of the second antenna elements in a first mode or a second mode,
   wherein in the first mode, a first subset of the second antenna elements is configured to provide a secondary function to support communication of the first antenna elements via the communication protocol and a second subset of the second antenna elements is configured to support beam forming of the first antenna elements or beam steering of the first antenna elements; and
   wherein in the second mode, one or more of the second antenna elements are configured to support beam forming of the first antenna elements or beam steering of the first antenna elements.

2. The antenna system of claim 1, wherein the communication protocol comprises a cellular communication protocol.

3. The antenna system of claim 1, wherein the secondary function comprises providing one or more additional antenna elements to support the multiple input multiple output mode communication via the communication protocol.

4. The antenna system of claim 1, wherein the antenna array comprises a 4×4 MIMO antenna array.

5. The antenna system of claim 1, wherein the control circuit comprises:
   a first switching component comprising a plurality of first switches, each of the first switches coupled to a corresponding antenna element of the first antenna elements; and a second switching component comprising a plurality of second switches, each of the second switches coupled to a corresponding antenna element of the second antenna elements.

6. The antenna system of claim 5, wherein the control circuit further comprises:
a phase shifting component coupled between the first switching component and the second switching component.

7. The antenna system of claim 6, wherein the phase shifting component comprises one or more phase shifters.

8. The antenna system of claim 6, wherein the phase shifting component comprises a plurality of transmission lines, each of the transmission lines having a different electrical length.

9. The antenna system of claim 1, wherein in the second mode, a third subset of the second antenna elements are configured to support beam forming or beam steering, and wherein the third subset has one or more additional second antenna elements relative to the second subset.

10. A mobile device comprising:
a housing;
an antenna array disposed on a surface of the housing, the antenna array having a plurality of first antenna elements and a plurality of second antenna elements, each of the first antenna elements operable to communicate one or more signals via a communication protocol in a multiple input multiple output mode; and
a control circuit configured to control operation of one or more of the second antenna elements in a first mode or a second mode,
wherein in the first mode, a first subset of the second antenna elements is configured to provide a secondary function to support communication of the first antenna elements via the communication protocol and a second subset of the second antenna elements is configured to support beam forming of the first antenna elements or beam steering of the first antenna elements; and
wherein in the second mode, one or more of the second antenna elements are configured to support beam forming of the first antenna elements or beam steering of the first antenna elements.

11. The mobile device of claim 10, wherein the communication protocol comprises a cellular communication protocol.

12. The mobile device of claim 11, wherein the cellular communication protocol comprises a 5G communication protocol.

13. The mobile device of claim 10, wherein the secondary function comprises providing one or more additional antenna elements to support the multiple input multiple output mode communication via the communication protocol.

14. The mobile device of claim 10, wherein the control circuit comprises:
a first switching component comprising a plurality of first switches, each of the first switches coupled to a corresponding antenna element of the first antenna elements; and
a second switching component comprising a plurality of second switches, each of the second switches coupled to a corresponding antenna element of the second antenna elements.

15. The mobile device of claim 14, wherein the control circuit further comprises:
a phase shifting component coupled between the first switching component and the second switching component.

16. A method of configuring an antenna system comprising an antenna array having a plurality of first antenna elements and a plurality of second antenna elements, the method comprising:
operating, via a control circuit, the plurality of first antenna elements of the antenna array to communicate one or more signals via a communication protocol in a multiple input multiple output mode;
operating, via the control circuit, the plurality of second antenna elements of the antenna array in a first mode in which a first subset of the second antenna elements are configured to provide a secondary function to support communication of the first antenna elements via the communication protocol and a second subset of the second antenna elements are configured to support beam forming or beam steering of the first antenna elements; and
adjusting, via the control circuit, operation of the plurality of second antenna elements of the antenna array from the first mode to a second mode in which one or more of the second antenna elements are configured to provide beam forming or beam steering of the first antenna elements.

17. The method of claim 16, wherein the secondary function comprises operating one or more of the second antenna elements included in the first subset of the second antenna elements to support multiple input multiple output communication via the communication protocol.

18. The method of claim 16, wherein the secondary function comprises operating one or more of the second antenna elements included in the first subset of the second antenna elements to act as a diversity antenna element.

* * * * *